United States Patent [19]

Wetzel

[11] 4,360,426

[45] Nov. 23, 1982

[54] JOINT BETWEEN TRAVELING WATER SCREEN TRAYS

[75] Inventor: Jack D. Wetzel, Souderton, Pa.

[73] Assignee: FMC Corporation, Chicago, Ill.

[21] Appl. No.: 239,869

[22] Filed: Mar. 2, 1981

[51] Int. Cl.³ .............................................. B01D 33/32
[52] U.S. Cl. ..................................... 210/160; 210/158; 277/12
[58] Field of Search ............... 210/155, 158, 160, 359, 210/400; 277/12, 34.3

[56] References Cited

U.S. PATENT DOCUMENTS

| | | | |
|---|---|---|---|
| 1,564,451 | 12/1925 | Schroeder | 210/400 |
| 1,781,223 | 11/1930 | Gary | 210/160 |
| 1,815,137 | 7/1931 | Bleyer | 210/160 |
| 1,856,381 | 5/1932 | Gary | 210/160 |
| 1,963,460 | 6/1934 | Bleyer | 210/160 |
| 2,935,200 | 5/1960 | Lutz et al. | 210/400 |
| 3,570,674 | 3/1971 | Dahlem | 210/400 |
| 3,802,565 | 4/1974 | Hughes et al. | 210/158 |
| 4,176,984 | 12/1979 | Sommers | 210/154 |

*Primary Examiner*—Peter A. Hruskoci

*Attorney, Agent, or Firm*—Douglas W. Rudy; Richard B. Megley

[57] ABSTRACT

A traveling water screen has trays that travel one after the other along a path in the form of a vertical loop. Adjacent trays are connected for articulation about an axis extending transversely of the path. Each tray has a transverse member extending parallel and adjacent to the axis, with one member leading the other member in the direction of tray travel. The trailing member has a cross-sectional shape that extends linearly outward of the loop and curves about the axis of articulation both outwardly and forwardly relative to the path of travel. The leading member has a cross-sectional shape that extends outwardly of the loop beyond the curved portion of the trailing member to an outer edge where an extension projects rearwardly towards the curved portion. A flexible seal that is mounted on the leading member overlaps and contacts the curved portion of the trailing member on the opposite side thereof from the axis of articulation. In a preferred form of the invention, the seal is mounted to the leading member by a fastener that can be both fastened and removed from outside of that member.

11 Claims, 6 Drawing Figures

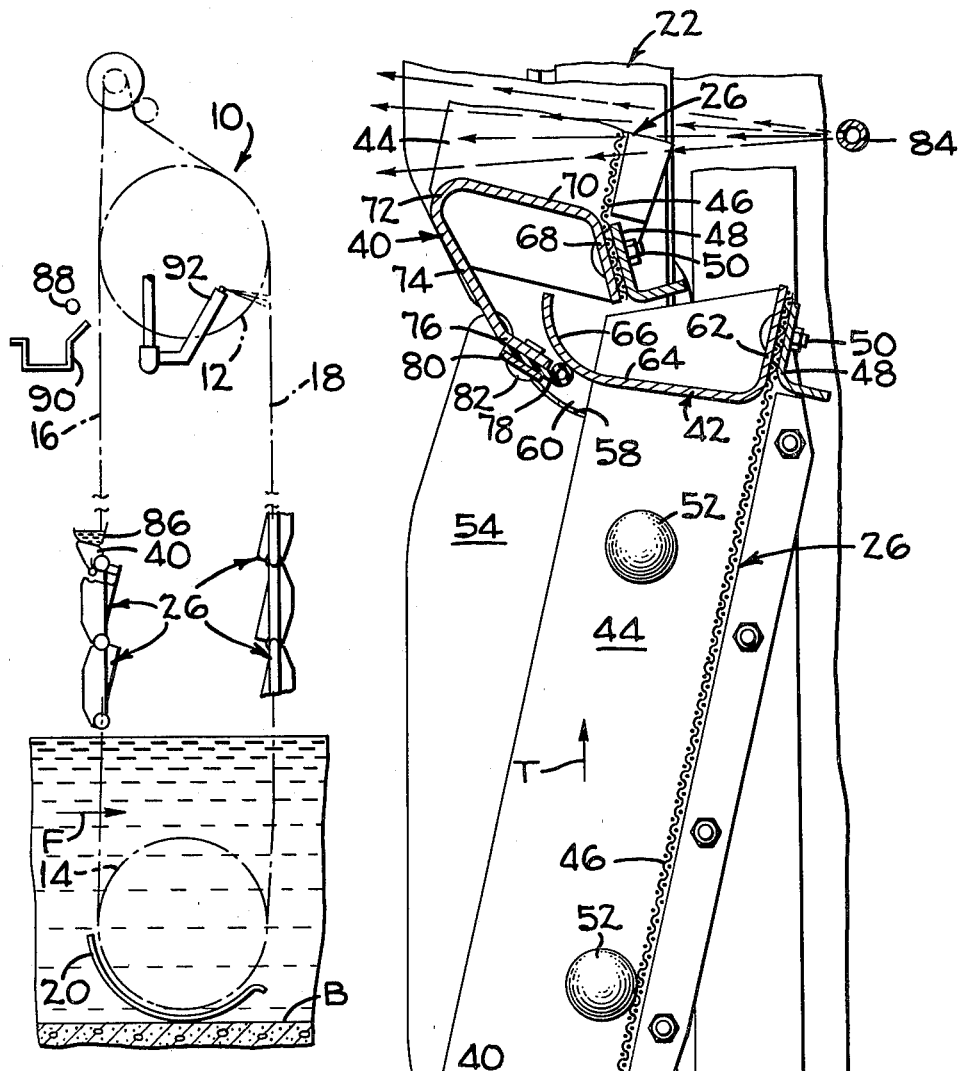
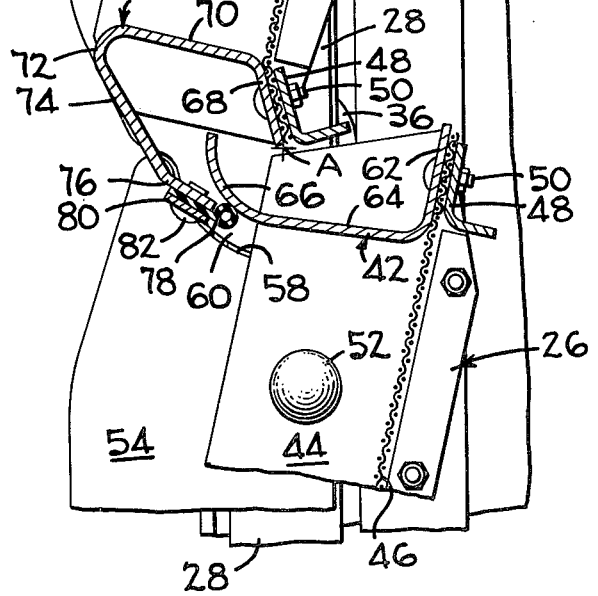

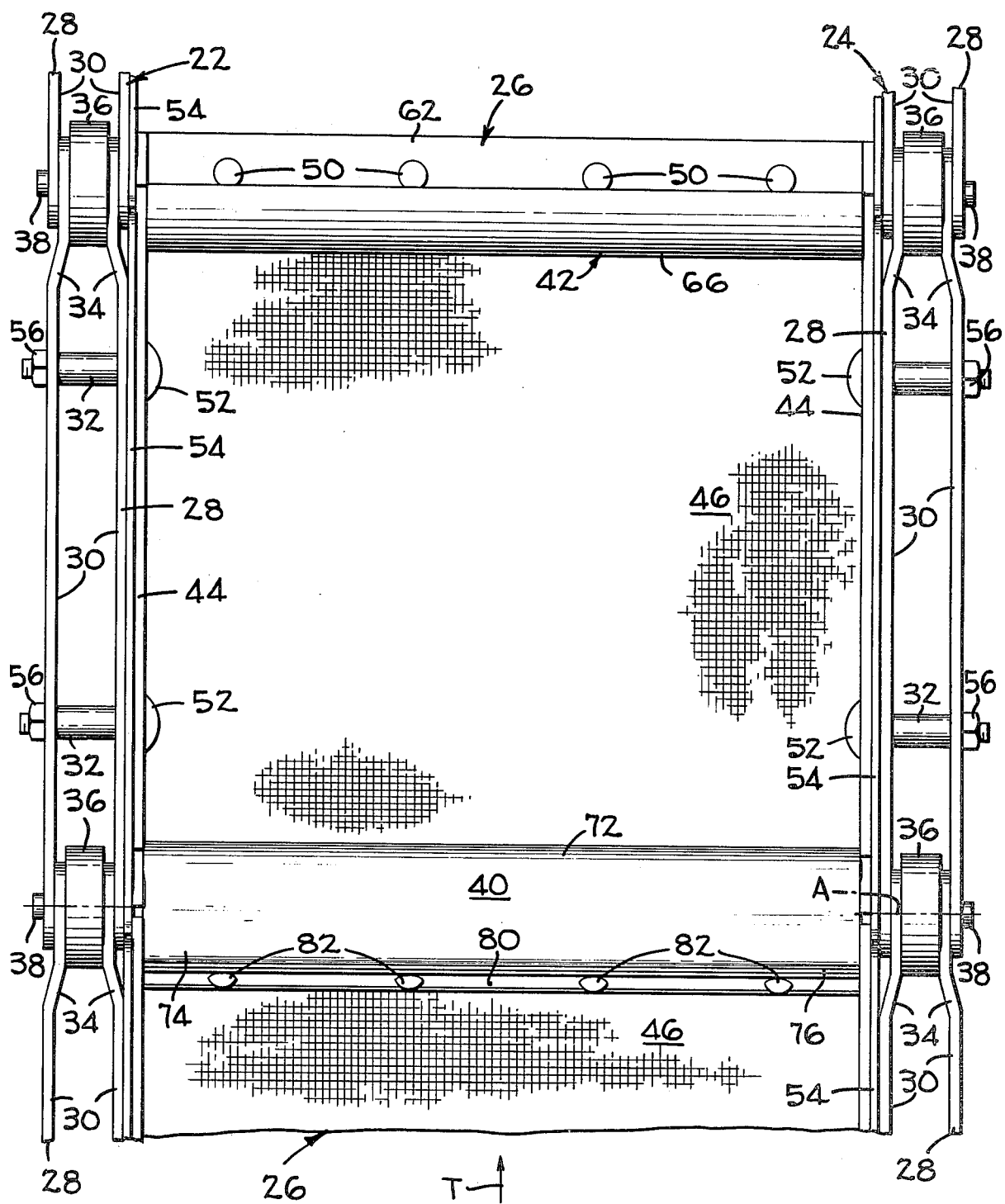
FIG_3

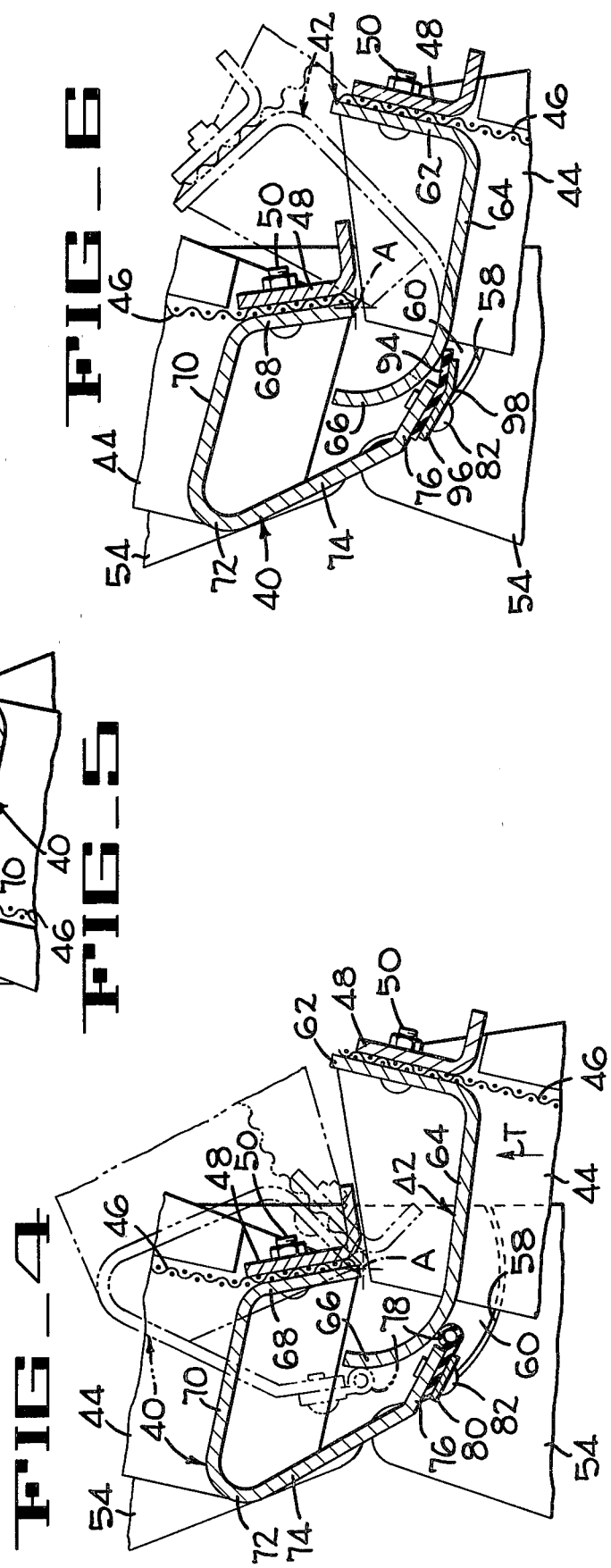

JOINT BETWEEN TRAVELING WATER SCREEN TRAYS

BACKGROUND OF THE INVENTION

1. Field of the Invention

This invention relates to a joint between traveling water screen trays. More specifically, the invention is directed to adjoining transverse members of adjacent screen tray frames and to a flexible seal therebetween.

2. Description of the Prior Art

A traveling water screen removes trash and coarse objects from a stream of water flowing in a water intake channel. Such screens can be equipped with pans for removing aquatic life from the stream, and the aquatic life is returned to the stream at a safe location remote from the screen. The traveling water screen extends transversely of the water intake channel. The screen is formed by a plurality of screen trays that are fastened on opposite sides to the links of long pitch chains that travel in an endless vertical loop about head sprockets and foot sprockets with ascending and descending runs therebetween. Each screen tray has a rectangular frame that is formed by a pair of side members and a pair of transverse members. A screen cloth is attached to the frame for straining the water that flows through the screen.

Water used for cooling purposes at power plants formerly has been passed through woven wire screen cloth having three-eighths inch square openings. Recently, there has been an increased emphasis upon the protection of aquatic life, such as fish larvae and eggs. This necessitates the use of screening media with openings of less than one millimeter wide. Previously acceptable operating clearances between screen trays must be reduced to correspond with the smaller openings in the screening media, but the screen trays must be able to move freely as the long pitch chains travel about the sprockets. Furthermore, the tray frame members should be formed and assembled to economically feasible tolerances. The tray frame members must be strengthened to withstand high differential head loads on the screens. The transverse members of the tray frames must be shaped and arranged to permit the screening surface to be flushed on either the ascending side or the descending side near the top of the vertical loop formed by the traveling water screen.

Some known traveling water screens have transverse seals between adjoining screen tray members. These seals are formed by adjoining transverse members having concentric curved portions that overlap in both vertical and horizontal planes. The transverse members are made of sheet metal, and thus, such seals are limited to economically feasible tolerances for forming and assembling the transverse members. These tolerances would be greater than allowable for the protection of fish larvae and eggs.

Tray to tray contact seals that include a flexible member have been used to provide a more complete seal. Such seals, as previously used, were not suitable for screens with a back wash system because the seals retained debris dislodged from the screen by the back wash.

SUMMARY OF THE INVENTION

Among the objects of the present invention are to provide seals between trays of a traveling water screen that can be either front washed or back washed, to provide a seal that can be changed without removing the tray supporting the seal from the endless chains, to provide for fabrication of the tray members to nominal tolerances and to reduce the unsealed spacing between trays during operation to zero, and to provide tray members shaped to accommodate the above features while providing greater strength than conventional angle members.

According to the present invention, there is provided in a joint between adjacent traveling water screen trays that are connected for articulation about an axis extending transversely of a path along which the trays travel seriatim in a vertical loop, each tray having a transverse member extending parallel and adjacent to the axis with one member leading the other member in the direction of tray travel, the improvement comprising the trailing member having a cross-sectional shape that extends linearly outward of the loop and curves about the axis of articulation both outwardly and forwardly relative to the path of travel, the leading member having a cross-sectional shape that extends outwardly of the loop beyond the curved portion of the trailing member to an outer edge from where an extension projects rearwardly towards the curved portion, and a flexible seal mounted on the leading member for overlapping and contacting the curved portion of the trailing member on the opposite side thereof from the axis of articulation.

The flexible seal provides continuous contact between each transverse member as these members rotate about the axis of articulation. The shape of the members and the seal enable the traveling water screen to be either front washed or back washed without retaining debris. In a preferred form of the invention, the seal is mounted to the leading member by a fastener that can be both fastened and removed from outside of that member.

BRIEF DESCRIPTION OF THE DRAWING

FIG. 1 is a diagrammatic view illustrating a traveling water screen adapted for back washing.

FIG. 2 is a fragmentary sectional view in elevation of the ascending run of a traveling water screen having joints between trays embodying the present invention.

FIG. 3 is a front view of the tray section shown in FIG. 2.

FIG. 4 is an enlarged sectional view of a joint between trays on an ascending run with the articulation of the leading tray member as it travels about head sprockets illustrated in phantom line.

FIG. 5 is an enlarged sectional view of a joint between trays on a descending run of the traveling water screen.

FIG. 6 is an enlarged sectional view of a joint between trays having a modified form of flexible seal with the articulation of the trailing tray member as it travels about the foot sprockets illustrated in phantom line.

DESCRIPTION OF THE PREFERRED EMBODIMENTS

Looking now at FIG. 1, a traveling water screen 10 is located transversely of a channel through which water flows in the direction indicated by the arrow F. The screen travels in a vertical loop about head sprockets 12 and foot sprockets 14 with an ascending run 16 and a descending run 18. A boot seal 20 is provided between the foot sprockets and a bottom B of the channel. It will be understood that seals, not shown, are provided between the sides of the traveling water screen and the adjacent sides of the channel.

The traveling water screen 10 has a pair of long pitch endless chains 22 and 24, as shown in FIG. 3. These chains are trained about the head sprockets 12 and the foot sprockets 14 that are shown in FIG. 1. Looking now at FIGS. 2 and 3, a screen tray 26 extends transversely between each pair of aligned links 28, and adjacent trays and links are connected for articulation about an axis A extending transversely of a path of travel T.

Each chain link is formed by a pair of side bars 30 that are held in spaced relationship by hollow spacer bushings 32 that extend through the side bars. At one end of each link, the side bars are stepped inwardly, as indicated at 34, so that the link will fit between the side bars of the adjacent link. A roller 36 is supported for free rotational motion on a steel bushing, not shown, that is press-fitted into holes in the side bars adjacent the stepped ends. Adjacent links are connected by a pin 38 that is press-fitted into normally spaced end portions of adjacent side bars overlapping the stepped ends. A free rotating fit is maintained between the pin and the bushing on which the roller is mounted, with the central axis thereof being the axis of articulation A.

Each screen tray 26 has a rectangular frame formed by a pair of transverse members 40 and 42 and by a pair of end plates 44. A panel of screen cloth 46 is secured to the frame by clamping angles 48 and bolts 50. Bolts 52 pass through an end plate 44, an end closure plate 54, side bars 30, hollow spacer bushings 32, and nuts 56 to fasten the screen tray to the laterally aligned links 28 of the chains 22 and 24.

Each end closure plate 54 has an arcuate recess 58 at its leading end relative to the direction of travel T and an arcuate projection 60 at its trailing end. These recesses and projections permit the end closure plates to articulate with the endless chains 22 and 24 as the screen trays 26 travel around the head sprockets 12 and the foot sprockets 14, and such plates maintain a substantially continuous lateral closure of the screen trays. Thus, passage of refuse between adjacent end closure plates is prevented.

As illustrated in FIG. 2, the screen trays 26 are inclined relative to the ascending path of travel T so that the screen cloths 46 face slightly upward. The screen trays tend to overlap vertically between the adjacent transverse members 40 and 42 of leading and trailing screen trays. This arrangement prevents refuse from passing between the adjacent transverse members. In addition to the overlapping, a more complete seal is provided by further details of the joint between the adjacent transverse members.

Transverse member 42 has a mounting flange 62 that is fastened to the screen cloth 46 and clamping angles 48 by bolts 50. Extending outwardly from the mounting flange is a web 64 that at a point opposite the axis of articulation A becomes tangent to a portion 66 curving therefrom about the axis and forwardly in the direction of tray travel T.

Transverse member 40 has a mounting flange 68 that is fastened to the screen cloth 46. A lifting lip 70 extends outwardly from the mounting flange beyond the curved portion 66 of transverse member 42 to an outer edge 72. From there, an extension 74 slopes with components backwardly to the direction of tray travel T and inwardly towards the curved portion 66 to an end flange 76.

A flexible seal 78 is mounted to the end flange 76 by a mounting clamp 80 and a fastener 82. This seal overlaps the curved portion 66 of member 42 on the opposite side thereof from the axis of articulation A. Both the seal and the curved portion move in arcuate paths upon rotation about the axis, and the seal provides continuous contact between the members 40 and 42. The flexible seal 78 is made of a neoprene rubber extrusion having a cross-sectional P-shape with the stem portion thereof attached to the end flange 76 and the bulb portion thereof contacting the curved portion 66. Suitable P-shape seals are manufactured by Minor Rubber Co., Inc., of Bloomfield, N.J.

Fastener 82 can be both fastened and removed from the outside of transverse member 40. This fastener is a thermoplastic drive rivet that includes a pin inserted axially into the rivet body and protrudes from the head. The drive rivet is inserted into aligned holes through the mounting clamp 80, flexible seal 78, and end flange 76. The rivet is fastened thereto by hammering the protruding pin flush with the rivet head. This causes the blind end of the rivet protruding from the joined parts to flare. The rivet can be removed by driving the pin through the rivet and prying the head off the rivet. Suitable drive rivets are available from Southco, Inc., of Concordville, Pa.

With reference to FIG. 2, a spray pipe 84 directs a spray of water through the screen cloth 46 and over the lifting lip 70 to dislodge debris on the front side of the traveling water screen 10. Looking now at FIG. 1, a holding pan 86 is mounted on the lifting lip of each transverse member 40. Water and aquatic life is dipped from the stream and carried in the holding pan to a location near the head sprocket, where the pan is flushed by a spray pipe 88. The flushed aquatic life flows with water into a trough 90 and from there to a safe channel location remote from the traveling water screen. A spray pipe 92 directs a spray of water through the descending run 18 to dislodge debris on the back side of the traveling water screen.

While either side of a screen cloth 46 can be washed to dislodge debris from the cloth, when such washing occurs in the ascending run 16, it is considered a front wash. When it occurs in the descending run 18, it is considered a back wash. When either type of washing occurs, the transverse members projecting outwardly from the run being washed should not present pockets for catching debris. On an ascending run, as shown in FIGS. 2 and 4, the transverse member 40 provides a smooth surface over the lifting lip 70 and outer edge 72, while the extension 74 overlaps the curved portion 66 of transverse member 42. On a descending run, as shown in FIG. 5, the screen cloth 46 can be backwashed with the water and debris flowing over the transverse member 42, flexible seal 78 and down the extension 74 of the transverse member 40.

Looking again at FIG. 4, the transverse member 40 shown in solid line represents the typical position on an ascending run, while the phantom line position illustrates the transverse member when the leading screen tray turns about the head sprocket. In such case, seal 78 moves from near the point of tangency of the curved portion 66 to the forward end thereof. With reference to FIG. 6, the structure shown in phantom line illustrates the position of transverse member 42 when the trailing tray screen is in the boot section turning about the foot sprocket 14.

FIG. 6 illustrates a modified form of the invention wherein a flexible seal 94 is formed from a flat strip of neoprene rubber. The seal is fastened to the end flange 76 by a clamp bar 96 and fasteners 82. A bend 98 in the clamp bar inclines the outer lip of the seal into contact with the curved portion 66 of the transverse member 42.

The transverse members 40 and 42 have cross-sectional shapes with greater area, large section moduluses, and larger moments of inertia, relative to axes about which the members are subjected to stress, than conventional structural shapes such as angles and channels.

Transverse members 40 and 42 are formed so that when the trays are assembled on the endless chains 22 and 24, a coarse seal is established due to the close proximity of the transverse members. Nominal operating clearances will provide a seal adequate for screen cloth with a ⅜-inch square opening. The flexible seals 78 and 94 reduce the nominal operating clearances between adjoining transverse members to zero clearance or continuous contact. Thus, a continuous contact seal is maintained between the screen trays 26 as the trays turn through a 180° curve about the foot sprockets 14. There is a head loss due to water flowing through the screen cloth 46, and this produces a slight pressure differential underwater between the front and the back of the transverse members. This pressure differential causes the flexible seals to maintain contact with the curved portion 66 of transverse member 42.

From the foregoing description, it will be apparent that the present invention provides a continuous contact seal between adjacent trays of a traveling water screen that can be either front washed or back washed. The seals can be changed without removing from the endless chains the tray that supports the seal. Tray members can be fabricated to nominal tolerances, and the unsealed spacing between trays can be reduced to zero by the seal during operation. The tray members are shaped to accommodate the above features while providing greater strength than conventional angle members.

Although the best mode contemplated for carrying out the present invention has been herein shown and described, it will be apparent that modification and variation may be made without departing from what is regarded to be the subject matter of the invention.

What is claimed is:

1. In a joint between adjacent traveling water screen trays that are connected for articulation about an axis extending transversely of a path along with the trays travel seriatim in a vertical loop, each tray having a transverse member extending parallel and adjacent to the axis with one member leading the other member in the direction of tray travel, the improvement comprising the trailing member having a cross-sectional shape that extends linearly outward of the loop and curves about the axis of articulation both outwardly and forwardly relative to the path of travel, the leading member having a cross-sectional shape that extends outwardly of the loop beyond the curved portion of the trailing member to an outer edge from where an extension projects rearwardly towards the curved portion, and a flexible seal mounted on the leading member for continuous overlapping and contact with the curved portion of the trailing member on the opposite side thereof from the axis of articulation as the traveling water screen trays travel in the vertical loop.

2. In a joint between traveling water screen trays as described in claim 1 wherein said flexible seal is made of neoprene rubber extruded with a cross-sectional P-shape having a stem portion attached to the leading member and a bulb portion contacting the curved portion of the trailing member.

3. In a joint between traveling water screen trays as described in claim 1 wherein said flexible seal is made of a flat strip of neoprene rubber, and a clamp bar positioned on the opposite side of the seal from the leading member with a portion projecting therefrom inclined towards the curved portion of the trailing member.

4. In a joint between traveling water screen trays as described in claim 1 wherein said seal is mounted on the leading member by a fastener that can be both fastened and removed from outside of the leading member.

5. In a joint between traveling water screen trays as described in claim 4 wherein said fastener is a drive rivet.

6. A joint between traveling water screen trays that are connected for articulation about an axis extending transversely of a path along which the trays travel seriatim comprising a pair of endless chains in spaced parallel relationship, a plurality of screened trays connected between the chains on opposite sides of the axis with one tray leading the other tray in the direction of tray travel, each tray having a transverse member extending parallel and adjacent to the axis for supporting a screen cloth on a side thereof inwardly from the path of tray travel, the trailing member having a cross-sectional shape that extends outwardly from the screen to a point opposite the axis of articulation whereabout the shape curves through an arc having components forward in the direction of tray travel and outwardly beyond the axis, the leading member having a cross-sectional shape that extends outwardly from the screen beyond the curved portion of the trailing member to define a lifting lip with an outer edge from where the shape slopes with components backwardly to the direction of tray travel and inwardly towards the curved portion of the trailing member, and a flexible seal mounted on the backwardly inwardly sloping portion of the leading member for continuous overlapping and contact with the curved portion of the trailing member on the opposite side thereof from the axis of articulation as the traveling water screen trays travel in the vertical loop.

7. The joint described in claim 6 wherein said flexible seal is made of a neoprene rubber extrusion having a cross-sectional P-shape with a stem portion attached to the leading member and a bulb portion contacting the curved portion of the trailing member.

8. The joint described in claim 7 wherein said stem portion of the P-shape seal extends parallel to a line tangent to the curved portion of the trailing member.

9. The joint described in claim 6 wherein said flexible seal is made of a flat strip of neoprene rubber, and further including a bent backing plate positioned on the opposite side of the seal from the leading member with a portion projecting therefrom inclined towards the curved portion of the trailing member.

10. The joint described in claim 6 wherein said seal mounted on the leading member by a fastener that can be both fastened and removed from outside of the leading member.

11. The joint described in claim 10 wherein said fastener is a drive rivet.

* * * * *